(12) United States Patent
Kim

(10) Patent No.: US 10,339,176 B2
(45) Date of Patent: Jul. 2, 2019

(54) DEVICE FOR PROVIDING IMAGE RELATED TO REPLAYED MUSIC AND METHOD USING SAME

(71) Applicant: GROOVERS Inc., Seongnam-si (KR)

(72) Inventor: Min-Soeng Kim, Seoul (KR)

(73) Assignee: GROOVERS INC., Seongnam-si (KR)

( * ) Notice: Subject to any disclaimer, the term of this patent is extended or adjusted under 35 U.S.C. 154(b) by 31 days.

(21) Appl. No.: 14/898,343

(22) PCT Filed: Oct. 29, 2014

(86) PCT No.: PCT/KR2014/010259
§ 371 (c)(1),
(2) Date: Dec. 14, 2015

(87) PCT Pub. No.: WO2015/163552
PCT Pub. Date: Oct. 29, 2015

(65) Prior Publication Data
US 2016/0132533 A1    May 12, 2016

(30) Foreign Application Priority Data
Apr. 22, 2014  (KR) .................. 10-2014-0048057

(51) Int. Cl.
*G06F 16/58*   (2019.01)
*G06F 16/583*  (2019.01)
(Continued)

(52) U.S. Cl.
CPC ............ *G06F 16/58* (2019.01); *G06F 16/583* (2019.01); *G06F 16/5838* (2019.01);
(Continued)

(58) Field of Classification Search
None
See application file for complete search history.

(56) References Cited

U.S. PATENT DOCUMENTS 8,115,698 B2 *   2/2012   Azor ................... G02F 1/1347
                                                            345/1.1
8,655,667 B2 *   2/2014   Chandrasekar ........ G06Q 30/02
                                                            704/257
(Continued)

FOREIGN PATENT DOCUMENTS

KR   1020010054564 A   7/2001
KR   1020060037043 A   5/2006
(Continued)

OTHER PUBLICATIONS

Machine Translation of KR 2015-0112048 A.*
International Search Report for PCT/KR2014/010259 dated Jan. 26, 2015.

*Primary Examiner* — Michelle M Entezari
(74) *Attorney, Agent, or Firm* — Brinks Gilson & Lione

(57) ABSTRACT

Disclosed are a device and method for providing an image related to playing music. Information about the mood of the playing music and information about the state of the user listening to the music are collected, and one or more relevant images corresponding to at least one of the mood information and the state information may be extracted from a user image source pool and may be output to the terminal of the user. Because background images matching the mood of the music to which the user is listening or the environment of the user listening to the music are provided, the user may recall the memory related to the image and the situation when the image was stored while listening to the music, whereby the corresponding music may sound more familiar to the user.

14 Claims, 6 Drawing Sheets

(51) Int. Cl.
*G06F 16/683* (2019.01)
*G06K 9/62* (2006.01)
*H04N 21/422* (2011.01)
*H04N 21/439* (2011.01)
*H04N 21/442* (2011.01)
*H04N 21/81* (2011.01)

(52) U.S. Cl.
CPC ........ *G06F 16/5866* (2019.01); *G06F 16/683* (2019.01); *G06K 9/6201* (2013.01); *H04N 21/42202* (2013.01); *H04N 21/4394* (2013.01); *H04N 21/44218* (2013.01); *H04N 21/44222* (2013.01); *H04N 21/8113* (2013.01); *H04N 21/8153* (2013.01)

(56) References Cited

U.S. PATENT DOCUMENTS

| | | | | |
|---|---|---|---|---|
| 9,792,003 | B1* | 10/2017 | Story, Jr. | G06F 3/0484 |
| 2002/0171551 | A1* | 11/2002 | Eshelman | G06Q 50/22 |
| | | | | 340/573.1 |
| 2003/0133569 | A1* | 7/2003 | Stern | G06F 21/84 |
| | | | | 380/206 |
| 2005/0158037 | A1* | 7/2005 | Okabayashi | G10H 1/368 |
| | | | | 386/248 |
| 2007/0250901 | A1* | 10/2007 | McIntire | H04N 7/17318 |
| | | | | 725/146 |
| 2008/0320036 | A1* | 12/2008 | Winter | G06F 17/30265 |
| 2009/0034786 | A1* | 2/2009 | Newell | G06F 16/5838 |
| | | | | 382/100 |
| 2009/0222388 | A1* | 9/2009 | Hua | G06K 9/00778 |
| | | | | 706/12 |
| 2010/0030578 | A1* | 2/2010 | Siddique | G06Q 10/0637 |
| | | | | 705/3 |
| 2010/0049679 | A1* | 2/2010 | Phillips | G06Q 30/02 |
| | | | | 706/15 |
| 2010/0091138 | A1 | 4/2010 | Nair | |
| 2010/0125568 | A1* | 5/2010 | van Zwol | G06K 9/46 |
| | | | | 707/722 |
| 2010/0131608 | A1* | 5/2010 | Firminger | G06Q 10/10 |
| | | | | 709/206 |
| 2011/0119584 | A1 | 5/2011 | Kaufman | |
| 2011/0188742 | A1 | 8/2011 | Yu et al. | |
| 2011/0288917 | A1* | 11/2011 | Wanek | G06Q 30/00 |
| | | | | 705/14.5 |
| 2012/0143391 | A1* | 6/2012 | Gee | G06F 3/01 |
| | | | | 701/1 |
| 2012/0155832 | A1* | 6/2012 | Miyajima | G06F 17/30265 |
| | | | | 386/240 |
| 2012/0158503 | A1* | 6/2012 | Mardikar | G06Q 30/0269 |
| | | | | 705/14.53 |
| 2013/0254287 | A1* | 9/2013 | Biswas | H04L 65/403 |
| | | | | 709/204 |
| 2014/0164940 | A1* | 6/2014 | Fisher | G06F 3/1431 |
| | | | | 715/741 |
| 2014/0178034 | A1* | 6/2014 | Kim | H04N 5/765 |
| | | | | 386/230 |
| 2014/0277649 | A1* | 9/2014 | Chong | G06N 99/005 |
| | | | | 700/94 |
| 2014/0283100 | A1* | 9/2014 | Harrison | G06F 21/6245 |
| | | | | 726/26 |
| 2014/0298364 | A1* | 10/2014 | Stepanov | H04N 21/25 |
| | | | | 725/10 |
| 2014/0324831 | A1* | 10/2014 | Choi | G06F 17/301 |
| | | | | 707/722 |
| 2014/0344687 | A1* | 11/2014 | Durham | G06F 1/1686 |
| | | | | 715/716 |
| 2015/0050921 | A1* | 2/2015 | Chu | H04W 4/20 |
| | | | | 455/414.3 |
| 2015/0135067 | A1* | 5/2015 | Ellis | G06F 17/211 |
| | | | | 715/273 |
| 2015/0286698 | A1* | 10/2015 | Gagnier | G06F 17/30595 |
| | | | | 707/736 |
| 2015/0379088 | A1* | 12/2015 | Shimizu | G06Q 30/0255 |
| | | | | 707/722 |

FOREIGN PATENT DOCUMENTS

| | | |
|---|---|---|
| KR | 1020100040443 A | 4/2010 |
| KR | 102010095166 | 8/2010 |
| KR | 1020110097151 A | 8/2011 |
| KR | 101104057 B1 | 1/2012 |
| KR | 20150112048 A * | 10/2015 |

* cited by examiner

DEVICE FOR PROVIDING IMAGE RELATED TO REPLAYED MUSIC AND METHOD USING SAME

CROSS REFERENCE TO RELATED APPLICATION

This application claims the benefit of Korean Patent Application No. 10-2014-0048057 filed on Apr. 22, 2014 in the Korean Patent and Trademark Office. Further, this application is the National Phase application of International No. PCT/KR2014/010259 filed on Oct. 29, 2014, which are hereby incorporated by reference in their entirety into this application.

TECHNICAL FIELD

The present invention generally relates to a device and method for providing an image related to playing music, which provide a background image that matches or is suitable for the currently playing music. More particularly, the present invention relates to a device and method for providing an image related to playing music, capable of providing a user with a related image extracted from among images included in the image source pool of the user by collecting information about the mood of the playing music and information about the state of the user.

BACKGROUND ART

With the development of smart phones, people may perform various functions through personal terminals, such as playing music, viewing images, web surfing, SNS activities, and the like. Among the various functions, when music is playing in the terminal, or when specific music recommended by a music service is playing in the terminal, the content of lyrics of the corresponding music, an album cover image, etc. are added and provided as a background image. Also, when a user is listening to music using a terminal, multi-tasking, in which the terminal simultaneously performs another function, may be performed, or only the music player may be executed in the terminal while the user is doing other work.

The present invention intends to introduce a technique in which various images, related to music and the user, are sequentially shown instead of an album cover image while the user is listening to the music using a terminal as described above, relationships between the music preferred by each user or specific music and the images matching such music are constructed, and recommendable products are associated with the related images, whereby the user may access the corresponding products more conveniently.

As a related art of the present invention, there is Korean Patent Application Publication No. 10-2006-0037043, disclosed at May 3, 2006 and titled "method and system for providing contents recommendation service using network".

DISCLOSURE

Technical Problem

An object of the present invention is to provide a background image, formed using the images related to a user, to match the mood of music or the environment of the user when the user listens to the music.

Also, another object of the present invention is to provide easy accessibility to products that a user may need by recommending products, associated with music and a background image, by exposing them when the music and the background image are provided.

Technical Solution

To accomplish the above object, a device for providing an image related to playing music, according to the present invention, includes an information collection unit for collecting information about a mood of playing music and information about a state of a user who is listening to the music; an image extraction unit for extracting one or more relevant images, corresponding to at least one of the information about the mood and the information about the state, from a user image source pool; and an image output unit for outputting the one or more relevant images to a terminal of the user.

The device for providing an image related to playing music may further include a pool generation unit for generating the user image source pool by acquiring one or more of images stored in the terminal of the user and images extracted from an SNS of the user.

The image extraction unit determines an environment of the user using the information about the state, and may extract the one or more relevant images mostly from any one of a group of the images stored in the terminal of the user and a group of the images extracted from the SNS according to a result of the determination.

The images extracted from the SNS may include one or more of images uploaded to the SNS and images for which the user performed an activity on the SNS.

The pool generation unit may store a time at which each of the images stored in the terminal was stored and a time at which each of the images extracted from the SNS was posted on the SNS in the user image source pool in association with a corresponding image.

The pool generation unit may acquire past weather data corresponding to the time at which each of the images was stored and the time at which each of the images was posted on the SNS, and store the past weather data in the user image source pool in association with a corresponding image.

The image extraction unit may determine a tempo of the music, and extract one or more relevant images corresponding to a clear day using the past weather data when the tempo is equal to or faster than a predetermined tempo.

The image extraction unit may extract the one or more relevant images using past weather data corresponding to current weather among the past weather data and using chroma and brightness of images stored in the user image source pool.

The device for providing an image related to playing music may further include a manipulation information collection unit for collecting user manipulation information, which is information indicating that the user manipulates the terminal of the user to change an image output to the terminal of the user; and an image extraction rule generation unit for generating an image extraction rule by collecting histories of use of an image according to music from multiple users.

The image extraction unit may extract one or more relevant images from among images preferred by the user and images preferred according to music using the user manipulation information.

The image extraction unit may extract one or more relevant images corresponding to the playing music using the image extraction rule.

The device for providing an image related to playing music may further include a product recommendation unit for recommending at least one of a tour package, a product targeted at an age range, a gift product, and a real product including an object-related product corresponding to an image, according to image types of the one or more relevant images.

The information about the mood may include at least one of a tempo, popularity, and release date of the music.

The information about the state may include at least one of a current location of the user, a moving state of the user, ambient noise, current weather, a current season, and a current day of week.

Also, the method for providing an image related to playing music, according to the present invention, includes collecting information about a mood of playing music and information about a state of a user who is listening to the music; extracting one or more relevant images, corresponding to at least one of the information about the mood and the information about the state, from a user image source pool; and outputting the one or more relevant images to a terminal of the user.

The method for providing an image related to playing music may further include generating the user image source pool by acquiring one or more of images stored in the terminal of the user and images extracted from an SNS of the user.

Extracting the one or more relevant images comprises determining an environment of the user using the information about the state, and the one or more relevant images may be extracted mostly from any one of a group of the images stored in the terminal of the user and a group of the images extracted from the SNS according to a result of the determination.

Generating the user image source pool may be configured to store a time at which each of the images stored in the terminal was stored and a time at which each of the images extracted from the SNS was posted on the SNS in the user image source pool in association with a corresponding image.

The method for providing an image related to playing music may further include recommending at least one of a tour package, a product targeted at an age range, a gift product, and a real product including an object-related product corresponding to an image, according to image types of the one or more relevant images.

Advantageous Effects

According to the present invention, because an image, corresponding to the mood of the music currently playing in a user's terminal or the state of the environment of the user, is provided, the user may recall the memory related to the image or remember the situation when the user stored the image, while listening to the music. As a result, the corresponding music may sound more familiar to the user.

Also, according to the present invention, when an image related to music is provided, products related to the image are exposed. Therefore, products optimized for a user may be conveniently recommended.

BEST MODE

Figure 1:
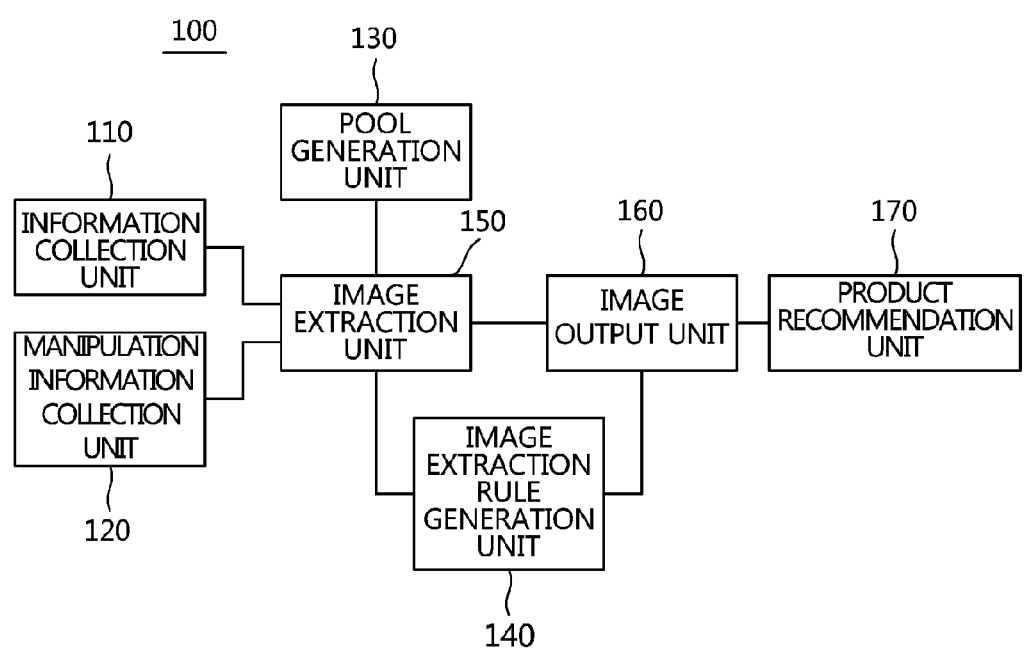
FIG. 1 is a block diagram illustrating a device for providing an image related to playing music, according to an embodiment of the present invention.

The present invention will be described in detail below with reference to the accompanying drawings. Repeated descriptions and descriptions of known functions and configurations which have been deemed to make the gist of the present invention unnecessarily obscure will be omitted below. It should be noted that the same reference numerals are used to designate the same or similar elements throughout the drawings.

Terms or words used in this specification and claims should not be interpreted according to typical or dictionary meanings, but should be interpreted as having meanings and concepts adapted to the technical idea of the present invention based on the principle that an inventor may properly define the concept of the terms in order to explain the present invention in the best way. Therefore, embodiments disclosed in this specification and configurations illustrated in the drawings are merely preferred embodiments of the present invention and do not fully describe the technical idea of the present invention, and thus there may be various equivalents and alterations replacing them at the filing date of the present application. Also, it will be understood that, although the terms "first", "second", etc. may be used herein to describe various elements, these elements should not be limited by these terms. These terms are only used to distinguish one element from another.

FIG. 1 is a block diagram illustrating a device for providing an image related to playing music, according to an embodiment of the present invention.

Referring to FIG. 1, a device 100 for providing an image related to playing music, according to an embodiment of the present invention, may include an information collection unit 110, a manipulation information collection unit 120, a pool generation unit 130, an image extraction rule generation unit 140, an image extraction unit 150, an image output unit 160, and a product recommendation unit 170.

The information collection unit 110 may collect information about the mood of the currently playing music and information about the state of the user who is listening to the music.

In this case, the mood information may include at least one of the tempo, popularity, and release date of the music. Such mood information may be acquired from a database in which meta-information about the music is stored, and information about fast-tempo music, popular music, the latest music, and the like may be constructed.

In this case, the state information may include at least one of the current location of the user, the moving state of the user, ambient noise, the current weather, the current season, and the current day of the week. For example, the noise around the user is measured using a microphone included in the user terminal, and as a result, it is possible to detect state information according to the situation, for example, whether there are many people around the user, whether the user is in a noisy place or in a quiet place, and the like. Also, the place where the user spends most of his or her time may be detected using statistics on information about the user's connection to base stations in different time periods and on information about the location of the user, and the state information may be detected using the current location or the moving state, detected by the GPS of the terminal.

The manipulation information collection unit 120 may collect information about the user's manipulation of a terminal to change the image to be output to his or her terminal. The information about the user's manipulation may be stored in the user terminal, and may then be transmitted to a central database to manage the history of the user. In this case, the information about the user's manipulation may be stored in the form of data such as a user ID, a sound source ID, a music ID, a manipulation information ID, the date, and the like.

The pool generation unit 130 may generate a user image source pool by acquiring one or more images from among the images stored in the user terminal and images extracted from the user's SNS. The images stored in the user terminal are contained in the photo album or gallery of the terminal, and most of the images are personally taken or stored by the user. Also, when the user views images through a user account, used for connecting the user terminal and a PC, or through other services, if the corresponding image can be acquired by ID federation, the image may also be acquired and extracted.

In this case, the time at which each of the images of the user terminal was stored in the user terminal and the time at which each of the images extracted from an SNS was posted on the SNS may be stored in the user image source pool and associated with the corresponding image. For example, the time at which an image was taken and stored using a camera application installed in the user terminal may be stored in connection with the image. Also, for images uploaded by the user's friends to an SNS, the time at which the user viewed or bookmarked the images, or the time at which the user clicked a 'like' button for the images may be stored in connection with the images extracted through such activities.

In this case, past weather data corresponding to the time at which the image was stored in the user terminal and the time at which the image was posted on an SNS is obtained, and the past weather data may be stored in the user image source pool so as to be associated with the corresponding image. For example, using the time at which an image was taken and stored using the camera application in the user terminal, weather data at the corresponding time is obtained and stored in connection with the image. Also, using the time at which the user uploaded an image to an SNS, weather data at the corresponding time is obtained, and the weather data may also be stored in connection with the image when the image on the SNS is extracted and stored.

The image extraction rule generation unit 140 may generate a rule for extracting an image by generating the history of use of images according to music using one or more relevant images output according to the music and by collecting the history of use of the images according to the music from multiple users. For example, the rule for extracting an image may be generated by checking the response rate collected from multiple users, for example, by checking the user's response when slow music is playing on a rainy day with an image taken on a rainy day as a background image, or the user's response when fast music is playing on a rainy day with an image taken on a clear day as a background image. Also, such a response rate may be accumulated for individual users and background image combination methods optimized for individual users may be determined.

The image extraction unit 150 may extract one or more relevant images corresponding to at least one of the mood information and the state information from the user image source pool.

In this case, the environment of the user is determined using the state information, and according to the result of the determination, one or more relevant images may be extracted from any one of a group of images stored in the user terminal and a group of images extracted from an SNS. For example, whether there are many people around the user is determined by measuring the noise around the user, and whether the user is staying in a private place is determined by detecting the moving state and the current location, whereby the environment of the user may be determined. Also, among the images included in the user image source pool, the images extracted from an SNS may be the revealed images. Therefore, even if such images are displayed in a public place, it may not embarrass the user. However, because the images stored in the user terminal may include private images, the images may be exposed only when it is determined that the user is in a private place.

In this case, the images extracted from the SNS may include at least one of the images uploaded to the SNS and the images for which the user performed some activity on the SNS. For example, the images uploaded by the user may be extracted as image sources by accessing to a user's SNS account. Also, when the user views or bookmarks images uploaded by the user's friends on the SNS, or when the user presses a 'like' button for the images, the images may be extracted as image sources.

In this case, the tempo of music is determined, and when the tempo is equal to or faster than a predetermined tempo, one or more relevant images corresponding to a clear day may be extracted using past weather data. For example, if the predetermined tempo is 100 bpm, when the tempo of the music that the user is listening to is equal to or faster than 100 bpm, an image having high brightness and high chroma, corresponding to a clear day, may be extracted from among the images included in the user image source pool.

In this case, one or more relevant images may be extracted using the past weather data corresponding to the current weather and using the brightness and chroma of the images included in the user image source pool. For example, assuming it is currently raining, a past rainy day is retrieved using the past weather data and an image linked to the retrieved day may be extracted from among the images included in the user image source pool. Also, if it is currently sunny, images having high brightness and high chroma may preferentially be extracted from among the images included in the user image source pool.

In this case, using the information about user's manipulation, one or more images may be extracted from among the images preferred by the user and the images preferred according to the music. For example, while the user listens to music and views the images provided via the terminal, if a favorite image is displayed, the user manipulates the terminal to view the image again when the image has passed, or if an image that the user wants to see while the corresponding music is playing is displayed, the user manipulates the terminal to fix the image. Accordingly, using the information about such user's manipulation, images preferred by the user and images preferred according to the music may be extracted.

In this case, one or more relevant images corresponding to the playing music may be extracted using a rule for extracting an image. For example, when the histories of use of images according to music are collected from multiple users, if the users tend to fix images of scenery for music A and to fix images containing couples for music B, an image extraction rule, by which images of scenery and couples are respectively extracted for the music A and B, may be generated.

The image output unit 160 may output one or more relevant images to the user's terminal. For example, one or more relevant images extracted for the currently playing music may be exposed in the form of a slide show. Also, when the user converts the terminal to a locked state and turns on the screen, the image may be displayed in a full-screen manner, or only the image may be displayed, hiding the play functions of the music player. Also, according to need, the user may personally change the image by swiping the screen to the left or right. For example, if a user's favorite image is exposed, the user may manipulate a function to view the image again when the image has passed, or if an image that the user wants to see while the corresponding music is playing is exposed, the user may fix the image. Also, in providing a background image for music, the operations for the images extracted from the user terminal and the operations for the images extracted from an SNS may be provided separately. For example, when the image extracted from the SNS is exposed and the user clicks the corresponding image, the user's activities on the SNS at the time at which the image was extracted may be shown. In contrast, when the user clicks the image extracted from the user terminal, the date and place at which the corresponding image was taken may be displayed via the image viewer installed in the terminal.

The product recommendation unit 170 may recommend at least one of travel packages, products targeted at a specific age range, gift products, and real products including an object-related product corresponding to the image, according to the type of at least one image. For example, the type of the image may be detected using information about whether the image contains people, whether the image contains scenery, whether the image contains animals, whether the image is an indoor image or an outdoor image, and the like. In this case, the additional information about the image for detecting the type of the image may be generated based on information about the user's tag in the case of an image from an SNS, and a higher-level concept may be extracted using an image processing technique in the case of an image stored in the individual user terminal. For example, the higher-level information indicating whether the image contains people, whether the image is about scenery, whether the image contains animals, whether the image is an indoor image or an outdoor image, and the like may be extracted. Also, according to the application of the image processing technique, a concept may be extracted using information about whether the image contains babies, whether the image contains children, whether the image is about clothing, whether the image contains a certain product, etc., Also, when the user starts to listen to music that has been determined to match images of scenery and images of scenery, among the images extractable from the user terminal and SNS, are displayed as background images, real items such as discounted tour packages, etc. may be recommended. This recommendation may be processed through a certain area or a pop-up window, and information about the location shown in the images displayed as background images is acquired, and tour packages for the place corresponding to the location or tour packages for places close to the location may be selected and provided. Also, when the current user continuously views images of babies regardless of what music is playing, if the current time is not far from the time when the images were stored, baby products may be recommended, whereas if the current time is far from the time when the images were stored, for example, if the images were stored about 6 to 8 years previously, products for school children may be recommended. Similarly, if the current user prefers images containing people as background images for music, the sex and age of the user are predicted based on phone subscriber information or other service subscriber information, and gift products for friends of the opposite sex may be recommended based on the predicted sex and age.

When a user listens to music using the above-mentioned device for providing an image related to the playing music, because the image matching the mood of the music or the image corresponding to the environment of the user may be provided as the background image of the music, the user may recall the memory related to the image or may remember the situation when the user stored the image, while listening to the music. Therefore, the corresponding music may sound more familiar to the user.

Figure 2:
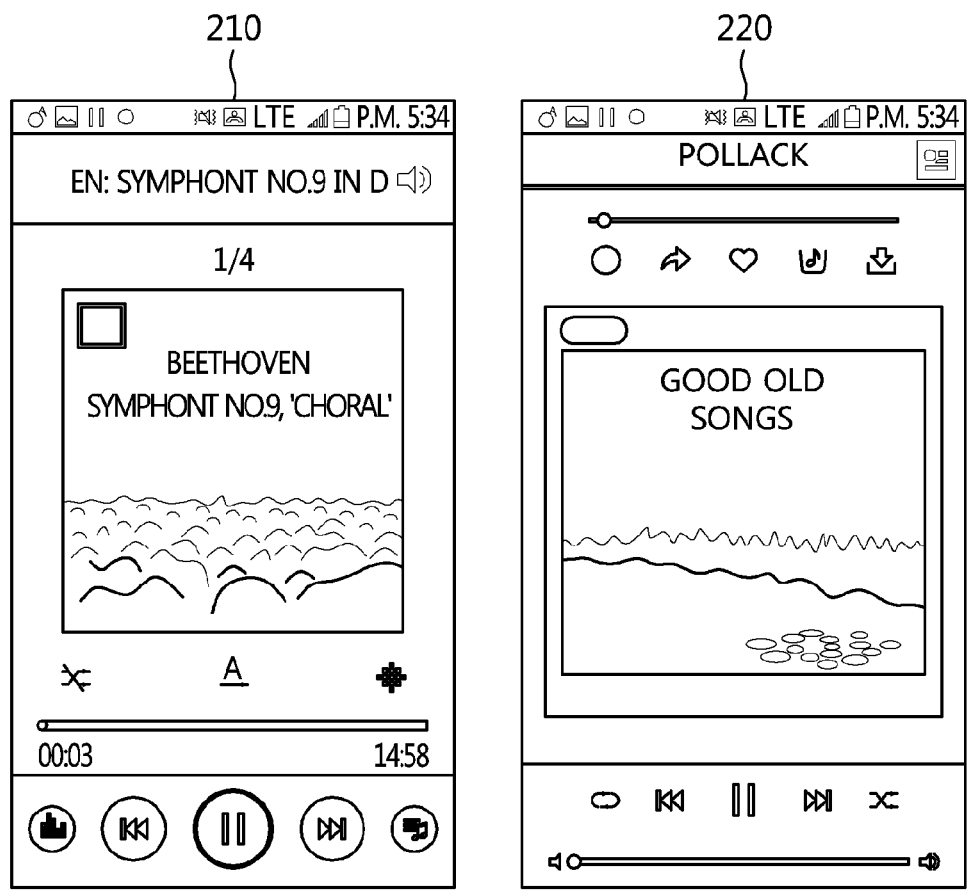
FIG. 2 is a view illustrating an existing music player.

FIG. 2 is a view illustrating an existing music player.

Referring to FIG. 2, existing music players 210 and 220 respectively represent the music player 210 installed in the user terminal by default and the music player 220 of a music-dedicated app provided through a separate music service.

The music player 210 installed in the user terminal by default may display a UI for user's manipulation, the information about the sound source of the playing music, and the lyrics of the music in the background image.

The music player 220 of the music-dedicated app provided through the separate music service may display a UI for user's manipulation, which looks different from that of the music player 210 installed in the user terminal by default but performs similar operations, and the cover image of the album including the music in the background image.

As described above, existing music players 210 and 220 do not display images related to the playing music. Accordingly, a UI for the images related to the playing music is not provided, and only the lyrics of the music and the cover image of the album based on tag information about the playing music are provided. Therefore, it is difficult to provide a user with a familiar feeling related to the playing music.

Figure 3:
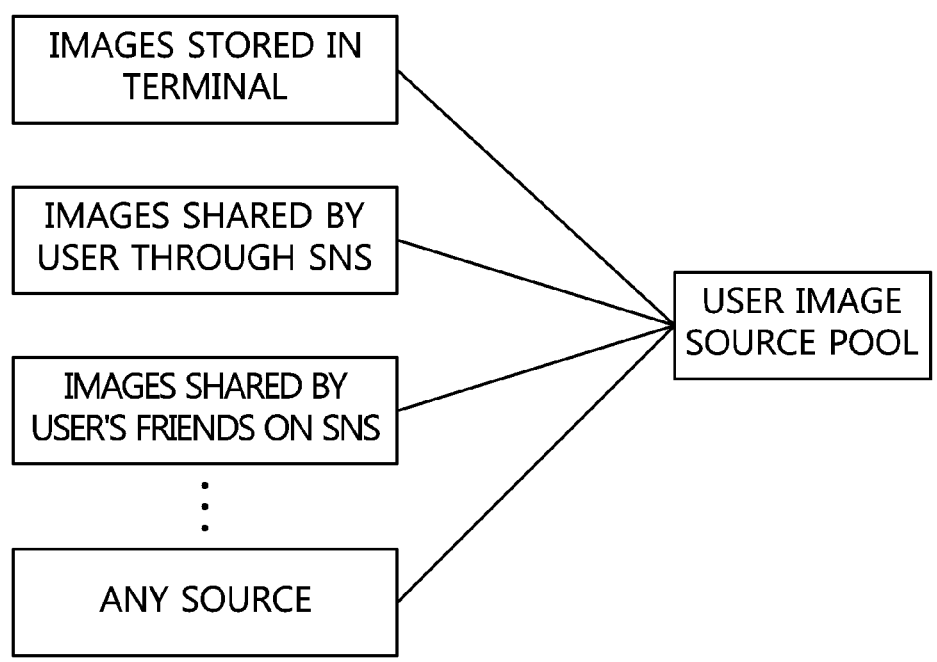
FIG. 3 is a view illustrating the configuration of the image source pool of a user, according to an embodiment of the present invention.

FIG. 3 is a view illustrating the configuration of an image source pool of a user, according to an embodiment of the present invention.

Referring to FIG. 3, a user image source pool according to an embodiment of the present invention may be generated using images stored in the user terminal, images shared by the user through an SNS, images shared by the user's friends on the SNS, any image source, and the like.

The images stored in the user terminal may be images contained in the photo album and gallery of the user terminal, such as images that the user took and stored using a camera application installed in the user terminal, images captured and stored using the user terminal, and the like.

The images shared by the user through an SNS and the images shared by the user's friends on the SNS may respectively be images uploaded to the SNS by the user and images uploaded to the SNS by the user's friends in connection with which the user performed some activity on the SNS, for example, the user viewed or bookmarked the images, or clicked a 'like' button for the images.

Additionally, when the user views images through a user account, used for connecting the user terminal and a PC, or through other services, if the corresponding image can be acquired by ID federation, the image may also be extracted and stored in the image source pool.

Figure 4:
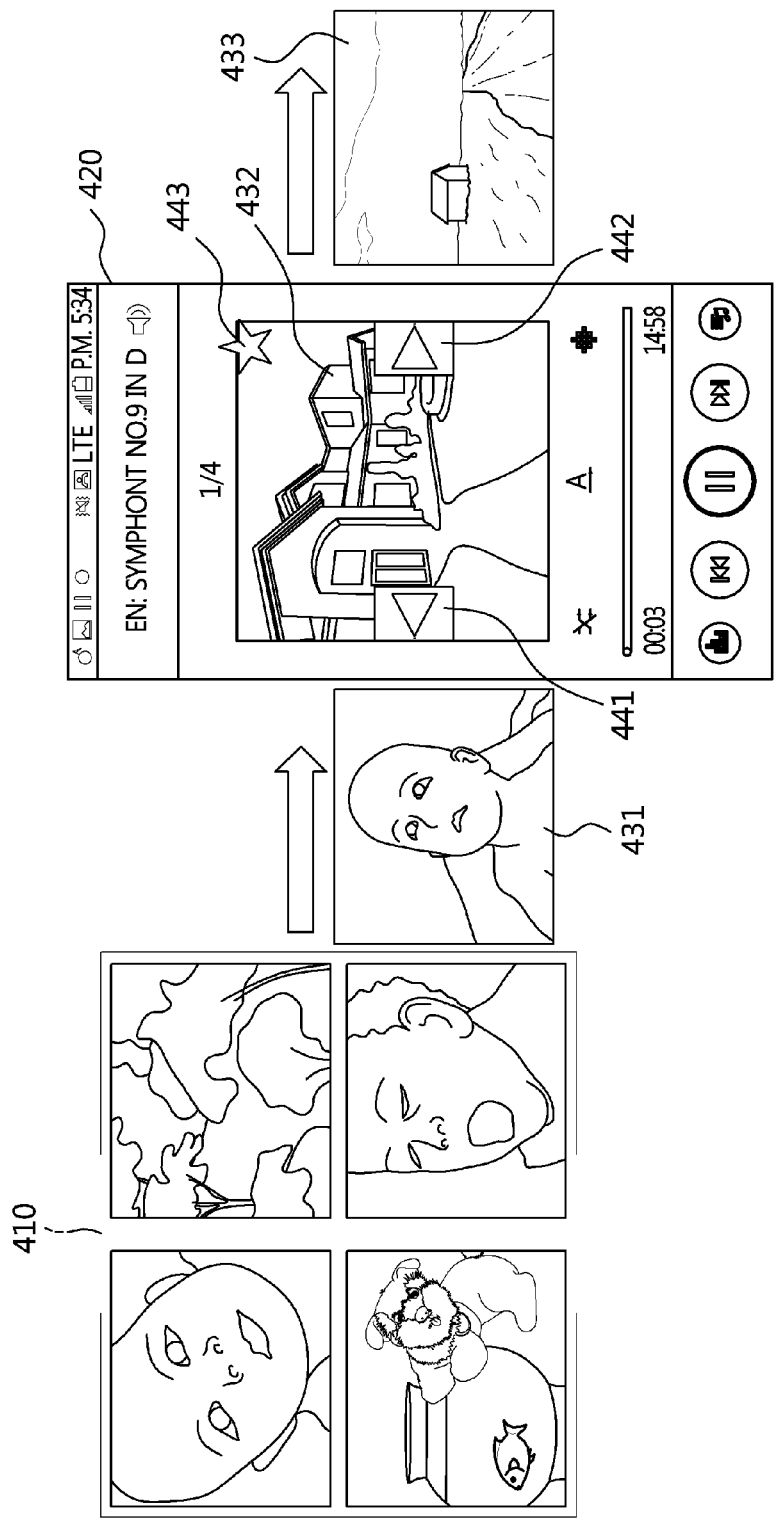
FIG. 4 is a view illustrating an example of a music player that provides an image related to playing music, according to an embodiment of the present invention.

FIG. 4 is a view illustrating an example of a music player that provides an image related to playing music, according to an embodiment of the present invention.

Referring to FIG. 4, a music player 420 that provides an image related to playing music according to an embodiment of the present invention may extract relevant images 431, 432, and 433 from among various source images included in the user image source pool 410 in consideration of the mood of the music and the state of the user.

The relevant images 431, 432, and 433 may sequentially be provided via the music player 420 if there is no information about the user's manipulation. If there is a user's favorite image, the user may manipulate left and right buttons 441 and 442 to view the previously displayed image again or to view the image to be displayed next. Also, using a current image fix button 443, the user may fix the favorite image while the music is playing. Using a database in which information about such user manipulation is collected and stored, information about the user's favorite image or images, preferred according to specific music, may be acquired, whereby a certain rule for extracting images may be generated.

Figure 5:
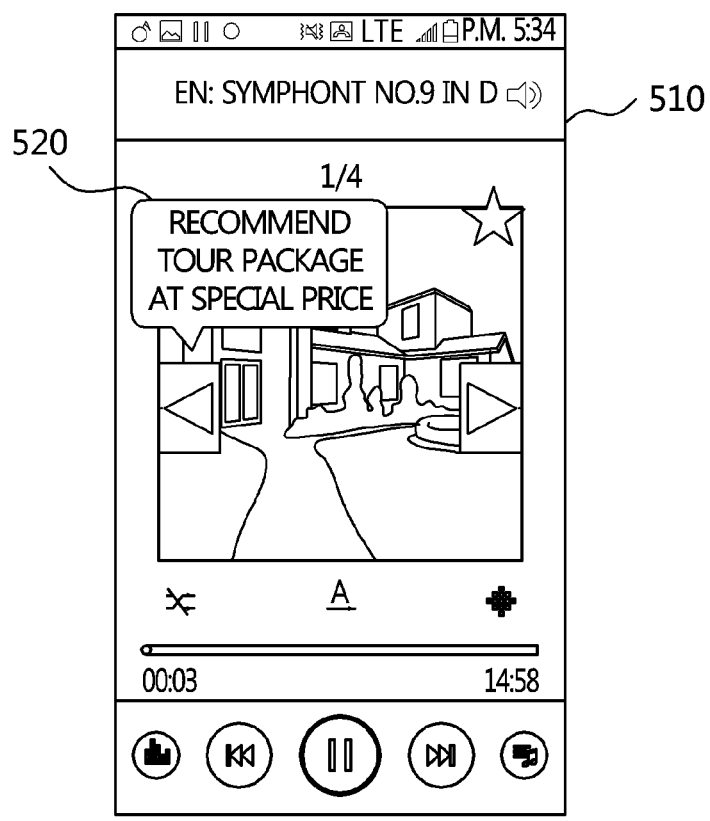
FIG. 5 is a view illustrating another example of a music player that provides an image related to playing music, according to an embodiment of the present invention.

FIG. 5 is a view illustrating another example of a music player that provides an image related to playing music, according to an embodiment of the present invention.

Referring to FIG. 5, a music player 510 that provides an image related to playing music, according to an embodiment of the present invention, may provide not only a background image that matches the music or corresponds to the state of a user but also a product recommendation pop-up window 520 for simultaneously recommending a product corresponding to the background image. For example, when the user starts to listen to music that has been determined to match images of scenery, the music player 510 provides relevant images corresponding to scenery as background images, and may also provide the product recommendation pop-up window 520 for recommending a discounted tour package corresponding to a real item. Location information for the relevant images of scenery is obtained, and tour packages for a place corresponding to the location or tour packages for places close to the location may be selected and provided as recommendation content.

Also, when the user continuously views relevant images containing babies regardless of the mood of the music, the recommendation pop-up window 520 related to baby products may be provided along with the relevant images.

Figure 6:
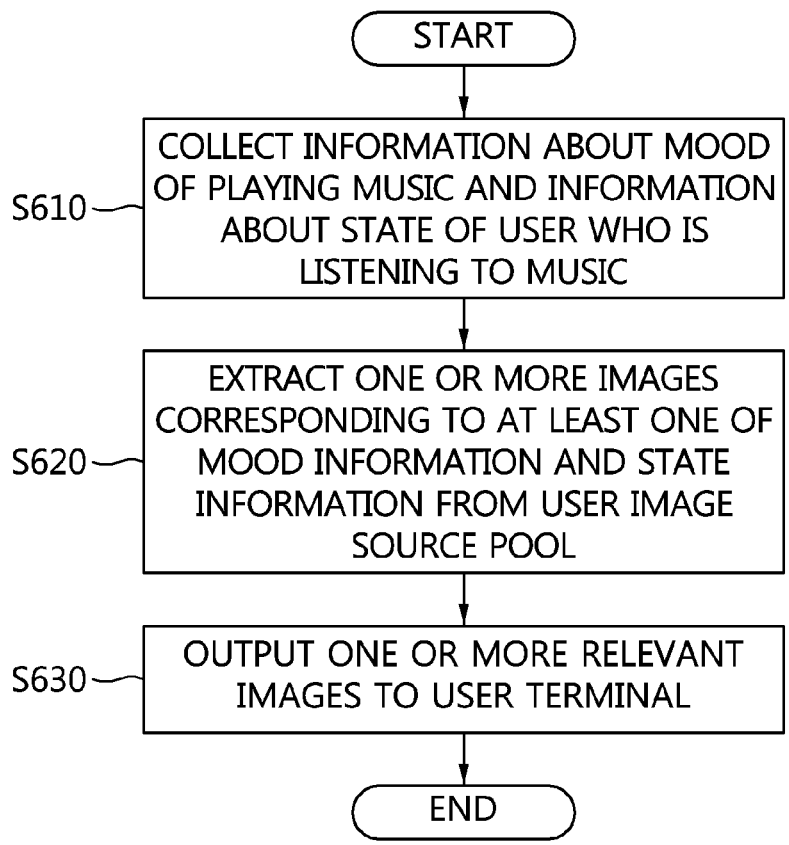
FIG. 6 is a flowchart illustrating a method for providing an image related to playing music, according to an embodiment of the present invention.

FIG. 6 is a flowchart illustrating a method for providing an image related to playing music, according to an embodiment of the present invention.

Referring to FIG. 6, a method for providing an image related to playing music, according to an embodiment of the present invention, may collect information about the mood of the music and information about the state of the user who is listening to the music at step S610.

Here, the information about the mood may include at least one of the tempo, popularity, and release date of the music. Such information about the mood of the music may be acquired through a database in which meta-information about the music is stored, and information about fast tempo music, popular music, the latest music, and the like may be constructed as the information about the mood.

Also, the information about the state of the user may include at least one of the current location of the user, the moving state of the user, ambient noise, the current weather, the current season, and the current day of the week. For example, the noise around the user is measured using the microphone included in the user terminal, whereby the information about the state, such as whether there are many people around the user, whether the user is in a noisy place or a quiet place, and the like may be detected. Also, the place where the user spends most of his or her time may be detected using statistics on information about the user's connection to base stations by time period or on information about the location of the user, and the information about the state may be detected using the current location or the moving state, detected by the GPS of the terminal.

Also, the method for providing an image related to playing music, according to an embodiment of the present invention, may extract one or more relevant images corresponding to at least one of the information about the mood and the information about the state from the user image source pool at step S620.

In this case, the environment of the user is determined using the information about the state, and one or more relevant images may be extracted mainly from at least one of a group of images stored in the user terminal and a group of images extracted from an SNS, depending on the result of the determination. For example, whether there are many people around the user is detected by measuring the noise around the user, and whether the user is staying in a private place is detected by detecting the moving state and current location of the user, whereby the environment of the user may be determined. Also, among the images included in the user image source pool, images extracted from an SNS are revealed images. Therefore, even if they are exposed in a public place, it doesn't embarrass the user. However, because the images stored in the user terminal may include the user's personal images, they may be exposed only when it is determined that the user is in a private environment.

In this case, the images extracted from an SNS may include at least one of the images uploaded to the SNS and the images for which the user perform some activity on the SNS. For example, the images uploaded by the user may be extracted as image sources by accessing to a user's SNS account. Also, when the user views or bookmarks the images, uploaded by the user's friends on the SNS, or when the user presses a 'like' button for the images, the images may be extracted as image sources.

In this case, the tempo of the playing music is determined, and when the tempo is equal to or faster than a predetermined tempo, one or more relevant images corresponding to a clear day may be extracted using past weather data. For example, if the predetermined tempo is 100 bpm, when the tempo of the music that the user is listening to is equal to or faster than 100 bpm, an image having high brightness and high chroma, corresponding to a clear day, may be extracted from among the images included in the user image source pool.

In this case, one or more relevant images may be extracted using past weather that is similar to the current weather among the past weather data and using the chroma and brightness of the images included in the user image source pool. For example, assuming that it is currently raining, previous rainy days are retrieved using the past weather data, and images associated with the retrieved days may be extracted from among the images included in the user image source pool. Also, if it is currently sunny, images having high chroma and high brightness may preferentially be extracted from among the images included in the user image source pool.

In this case, one or more relevant images may be extracted from among the images preferred by the user and the images preferred according to the music, using information about the user's manipulation. For example, while the user listens to music and views the images provided via the terminal, if a favorite image is displayed, the user manipulates the terminal to view the image again when the image has passed, or if an image that the user wants to see while the corresponding music is playing is displayed, the user manipulates the terminal to fix the image. Accordingly, using the information about such user manipulation, the images preferred by the user and the images preferred according to the music may be extracted.

In this case, one or more relevant images corresponding to the playing music may be extracted using a rule for extracting an image. For example, when the histories of use of images according to music are collected from multiple users, if the users tend to fix images containing scenery for music A and to fix images containing couples for music B, an image extraction rule, by which the images concerning scenery and couples are extracted respectively for the music A and B, may be generated.

Also, the method for providing an image related to playing music, according to an embodiment of the present invention, may output one or more relevant images to the user terminal at step S630. For example, one or more images, extracted for the currently playing music, may be exposed to the user in the form of a slide show. Also, when the user converts the terminal to a locked state and turns on the screen, the image may be displayed full screen, or only the image may be displayed, hiding the play functions of the music player. Also, according to need, the user may personally change the image by swiping the screen to the left or right. For example, if a user's favorite image is exposed, the user may manipulate a function to view the image again when the image has passed, or if an image that the user wants to see while the corresponding music is playing is exposed, the user may fix the image. Also, in providing a background image for music, the operations for the images extracted from the user terminal and the operations for the images extracted from an SNS may be configured separately. For example, when the image extracted from the SNS is exposed and the user clicks the corresponding image, the user's activity on the SNS at the time at which the image was extracted may be shown. Conversely, when the user clicks an image extracted from the user terminal, the date and place at which the corresponding image was taken may be displayed via the image viewer installed in the terminal.

Also, although not illustrated in FIG. 6, the method for providing an image related to playing music, according to an embodiment of the present invention, may collect information about the manipulation of the user terminal by the user for changing the image displayed thereon. The information about the user's manipulation is stored in the user terminal, and is then transmitted to a central database to manage the history of the user. In this case, the information about the user's manipulation may be stored as data in the form of a user ID, a sound source ID, a music ID, a manipulation information ID, a date, and the like.

Also, although not illustrated in FIG. 6, the method for providing an image related to playing music, according to an embodiment of the present invention, may generate a user image source pool by acquiring one or more images from among the images stored in the user terminal and the images extracted from the user's SNS data. The images stored in the user terminal are stored in the photo album or gallery of the terminal, and images taken by the user or stored by the user may mostly be extracted. Also, when the user views images through a user account that is used for connecting the user terminal to a PC, or through other services, if the corresponding images can be acquired by ID federation, such images may also be acquired and extracted.

In this case, the time at which each of the images of the user terminal was stored in the user terminal and the time at which each of the images extracted from an SNS was posted on the SNS may be associated with the corresponding images and may be stored in the user image source pool. For example, using a camera application in the user terminal, the time at which an image was taken and stored may be stored in connection with the image, or for an image uploaded by the user's friends, the time at which the user viewed or bookmarked the image or pressed a 'like' button for the image may be stored in connection with the image extracted from the SNS through such activities.

In this case, past weather data corresponding to the time at which the image was stored in the user terminal and the time at which the image was posted on the SNS may be acquired and stored in the user image source pool in connection with the corresponding image. For example, using the time at which an image was taken and stored using the camera application in the user terminal, the data about the weather at the corresponding time may be acquired and stored in connection with the image, or using the time at which the user uploaded an image to an SNS, the weather data at the corresponding time may be acquired and stored in connection with the image.

Also, although not illustrated in FIG. 6, the method for providing an image related to playing music, according to an embodiment of the present invention, may generate the history of use of an image according to music using one or more relevant images output according to the music, and may generate a rule for extracting an image by collecting the histories of use of images according to music from multiple users. The rule for extracting an image may be generated by checking the rate of various responses collected from multiple users, for example, by checking the response of the user when slow music is playing on a rainy day with an image taken on a rainy day as a background image or the response of the user when fast music is playing on a rainy day with an image taken on a clear day as a background image. Also, such response rate may be accumulated for individual users, and background image combination methods optimized for individual users may be determined.

Also, although not illustrated in FIG. 6, the method for providing an image related to playing music, according to an embodiment of the present invention, may recommend at least one of tour packages, products targeted at a specific age range, gift products, and real products including an object-related product corresponding to the image, depending on the type of at least one image. For example, the type of image may be detected using information about whether the image contains people, whether the image contains scenery, whether the image contains animals, whether the image is an outdoor image or an indoor image, and the like. In this case, additional information about these images for detecting the types of the images may be generated based on information about the user's tags in the case of images from an SNS, and a higher-level concept may be extracted using an image processing technique in the case of images stored in the individual user terminal. For example, the higher-level information indicating whether the image contains people, whether the image is about scenery, whether the image contains animals, whether the image is an outdoor image or indoor image, and the like may be extracted. Also, according to the application of the image processing technique, the concept may be extracted using the information about whether the image contains babies, whether the image contains children, whether the image contains clothing, whether the image contains a certain product, and the like. Also, when the user starts to listen to music that has been determined to match images of scenery and images of scenery, among the images extractable from the user terminal and SNS, are displayed as background images, real items such as discounted tour packages, etc. may be recommended. This recommendation may be processed through a certain area or a pop-up window, and location information for the images displayed as the background images is acquired and tour packages for the place corresponding to the location or tour packages for places close to the location may be selected and provided. Also, when the current user continuously views images containing babies regardless of which music is playing, if the current time is not far from the time at which the images were stored, baby products may be recommended, whereas if the current time is far from the time at which the images were stored, for example, if the images were stored about 6 to 8 years previously, products for school children may be recommended. Similarly, if the current user prefers images containing people as background images of music, the sex and age of the user are predicted based on phone subscriber information or other service subscriber information, and gift products for friends of the opposite sex may be recommended based on the predicted sex and age.

Using this method for providing an image related to playing music, a background image matching the music may be provided to a user, and real products linked with the image may be recommended simultaneously. Therefore, the user may be provided with convenience because the user may easily access the necessary items, and marketers may be provided with an effect of increased sales by exposing products to customers who are likely to buy the products.

The method for providing an image related to playing music, according to the present invention, may be implemented as a program that can be executed by various computer means. In this case, the program may be recorded on a computer-readable storage medium. The computer-readable storage medium may include program instructions, data files, and data structures solely or in combination. Program instructions recorded on the storage medium may have been specially designed and configured for the present invention, or may be known to or available to those who have ordinary knowledge in the field of computer software. Examples of the computer-readable storage medium include all types of hardware devices specially configured to record and execute program instructions, such as magnetic media, such as a hard disk, a floppy disk, and magnetic tape, optical media, such as CD-ROM and a DVD, magneto-optical media, such as a floptical disk, ROM, random access memory (RAM), and flash memory. Examples of the program instructions include machine code, such as code created by a compiler, and high-level language code executable by a computer using an interpreter. The hardware devices may be configured to operate as one or more software modules in order to perform the operation of the present invention, and vice versa.

As described above, a device and method for providing an image related to playing music are not limitedly applied to the configurations and operations of the above-described embodiments, but all or some of the embodiments may be selectively combined and configured, so that the embodiments may be modified in various ways.

INDUSTRIAL APPLICABILITY

According to the present invention, information about the mood of playing music and information about the state of the user who is listening to the music are collected, and one or more relevant images corresponding to at least one of the mood information and the state information is extracted and output to the terminal of the user, whereby a background image matching the music may be provided to the user. Furthermore, because products linked with the relevant images are recommended at the same time that the relevant images are provided to the user, the user may be induced to buy products suitable for that user, and thus a network capable of effectively selling products may be constructed.

The invention claimed is:

1. A terminal device for providing an image related to playing music, the terminal device comprising a processor, wherein said processor comprises:
   an information collection unit configured to collect information about a mood of playing music and information about a state of a user;
   a pool generation unit configured to generate a user image source pool by acquiring a first plurality of images stored in the terminal device and a second plurality of images extracted from an Social Networking Service (SNS) of a user's account;
   an image extraction unit configured to:
      extract a relevant image corresponding to the information about the mood of playing music and the information about the state of the user from the user image source pool;
      determine whether an environment of the user is a public place or a private place using an ambient noise;
      extract the relevant image from the first plurality of images when the environment of the user is the private place;
      extract the relevant image from the second plurality of images when the environment of the user is the public place; and
   an image output unit configured to:
      output the relevant image to be displayed on the terminal device to provide as a background image while music is playing;
      output, when the environment of the user is the private place, the relevant image extracted from the first plurality of images stored in the terminal device including private images; and
      output, when the environment of the user is the public place, the relevant image extracted from the second plurality of images extracted from the Social Networking Service (SNS) including revealed images.

2. The terminal device of claim 1, wherein the second plurality of images includes images uploaded to the SNS and images for which the user performed an activity on the SNS, wherein the image output unit is configured to provide the relevant image as the background image while music is playing, the terminal device performs (i) first operations corresponding to the first plurality of images extracted from the terminal device and (ii) second operations corresponding to the second plurality of images extracted from the Social Networking Service (SNS) separately based on sources of images.

3. The terminal device of claim 1, wherein the pool generation unit is configured to store a first time at which each of the first plurality of images stored in the terminal device was stored and a second time at which each of the second plurality of images extracted from the SNS was posted on the SNS in the user image source pool in association with a corresponding image.

4. The terminal device of claim 3, wherein the pool generation unit is configured to:
    acquire past weather data corresponding to the first time at which each of the first plurality of images was stored and the second time at which each of the second plurality of images was posted on the SNS, and
    store the past weather data in the user image source pool in association with a corresponding image,
    wherein the image extraction unit configured to extract the relevant image based on at least an image corresponding to the information about the state of the user among past weather data linked with a plurality of images stored in the user image source pool,
    wherein the image output unit configured to output the relevant image, wherein the relevant image is an image stored and uploaded based on past weather corresponding to the information about the state of the user.

5. The terminal device of claim 4, wherein the image extraction unit is configured to
    determine a tempo of the music, and
    extract the relevant image corresponding to a clear day using the past weather data when the tempo is equal to or faster than a predetermined tempo.

6. The terminal device of claim 4, wherein the image extraction unit is configured to extract the relevant image using past weather data corresponding to current weather among the past weather data and using chroma and brightness of images included in the user image source pool.

7. The terminal device of claim 6, wherein said processor further comprises:
    a manipulation information collection unit configured to collect user manipulation information, which is information indicating that the user manipulates the terminal device of the user to change an image output to the terminal device.

8. The terminal device of claim 7, wherein the image extraction unit is configured to extract the relevant image from among images preferred by the user and images preferred according to music using the user manipulation information.

9. The terminal device of claim 1, wherein said processor further comprises:
    a product recommendation unit configured to recommend at least one of a tour package, a product targeted at an age range, a gift product, and a real product including an object related product corresponding to an image, according to image types of the relevant image.

10. A method for providing an image related to playing music, the method performed by a processor of a terminal device, the method comprising:
    collecting information about a mood of playing music and information about a state of a user;
    generating a user image source pool by acquiring a first plurality of images stored in the terminal device and a second plurality of images extracted from an Social Networking Service (SNS) of a user's account;
    extracting a relevant image corresponding to the information about the mood and the information about the state of the user from the user image source pool;
    determining whether an environment of the user is a public place or a private place using an ambient noise;
    extracting the relevant image from the first plurality of images when the environment of the user is the private place;
    extracting the relevant image from the second plurality of images when the environment of the user is the public place;
    extracting the relevant image based on at least an image corresponding to the information about the state of the user among past weather data linked with a plurality of images stored in the user image source pool;
    outputting the relevant image on the terminal device to provide as a background image while music is playing;
    outputting, when the environment of the user is the private place, the relevant image extracted from the first plurality of images stored in the terminal device including private images; and
    outputting, when the environment of the user is the public place, the relevant image extracted from the second plurality of images extracted from the Social Networking Service (SNS) including revealed images.

11. The method of claim 10, wherein the user image source pool includes a first time at which each of the first plurality of images stored in the terminal device was stored and a second time at which each of the second plurality of images extracted from the SNS was posted on the SNS in the user image source pool in association with a corresponding image.

12. The method of claim 10, further comprising,
    recommending at least one of a tour package, a product targeted at an age range, a gift product, and a real product including an object-related product corresponding to an image, according to image types of the relevant image.

13. A non-transitory computer-readable medium storing a program causing a computer to execute an image providing process, the image providing process comprises:
    collecting information about a mood of playing music and information about a state of a user;
    generating a user image source pool by acquiring a first plurality of images stored in a terminal device and a second plurality of images extracted from an Social Networking Service (SNS) of a user's account;
    extracting a relevant image corresponding to the information about the mood and the information about the state of the user from the user image source pool;
    determining whether an environment of the user is a public place or a private place using an ambient noise;
    extracting the relevant image from the first plurality of images when the environment of the user is the private place;
    extracting the relevant image from the second plurality of images when the environment of the user is the public place;
    extracting the relevant image based on at least an image corresponding to the information about the state of the user among past weather data linked with a plurality of images stored in the user image source pool;
    outputting the relevant image on a terminal device to provide as a background image while music is playing;

outputting, when the environment of the user is the private place, the relevant image extracted from the first plurality of images stored in the terminal device including private images; and outputting, when the environment of the user is the public place, the relevant image extracted from the second plurality of images extracted from the Social Networking Service (SNS) including revealed images.

14. The terminal device of claim 2, wherein the image output unit is configured to provide the relevant image as the background image while music is playing, when the user clicks the relevant image extracted from the first plurality of images extracted from the terminal device, a date and a place at which the clicked image was taken are displayed via an image viewer installed in the terminal device, and when the user clicks the relevant image extracted from the second plurality of images extracted from the Social Networking Service (SNS), the user's activities on the SNS at a time at which the image was extracted are shown.

* * * * *